(12) United States Patent
Brown

(10) Patent No.: US 9,678,629 B2
(45) Date of Patent: Jun. 13, 2017

(54) FOCUSING ON MULTIPLE SELECTED ROWS WITHIN A DATA TABLE

(71) Applicant: Michael Brown, Brentwood, CA (US)

(72) Inventor: Michael Brown, Brentwood, CA (US)

(73) Assignee: ARIBA, INC., Sunnyvale, CA (US)

( * ) Notice: Subject to any disclaimer, the term of this patent is extended or adjusted under 35 U.S.C. 154(b) by 363 days.

(21) Appl. No.: 14/567,208

(22) Filed: Dec. 11, 2014

(65) Prior Publication Data

US 2016/0170576 A1 Jun. 16, 2016

(51) Int. Cl.
*G06F 3/048* (2013.01)
*G06F 3/0482* (2013.01)
*G06F 3/0485* (2013.01)
*G06F 3/0484* (2013.01)

(52) U.S. Cl.
CPC .......... *G06F 3/0482* (2013.01); *G06F 3/0485* (2013.01); *G06F 3/04842* (2013.01)

(58) Field of Classification Search
CPC ........ G06F 2203/04808; G06F 3/048–3/04886
See application file for complete search history.

(56) References Cited

U.S. PATENT DOCUMENTS

2008/0220747 A1* 9/2008 Ashkenazi ............. G06Q 30/02
455/414.1
2014/0331170 A1* 11/2014 Hyun .................. G06F 3/04842
715/784

* cited by examiner

*Primary Examiner* — Claudia Dragoescu
(74) *Attorney, Agent, or Firm* — Fountainhead Law Group P.C.

(57) ABSTRACT

Techniques are described for scrolling through a data table containing a list of items. A portion of a list of items can be presented in a container. During scrolling, selected items can become locked to a boundary of the container. When an item becomes locked, the item remains at a fixed position within the container, even during scrolling. A second container configured to present locked items can be generated once a predefined number of selected items have become locked within the container. The locked item can be moved from the container to the second container, thus freeing up available space within the container for the scrolling of items within the data table.

17 Claims, 9 Drawing Sheets

FIG. 3a

| | Description | Quantity | Price | Subtotal | |
|---|---|---|---|---|---|
| ☐ | Item A | 1 | $2 | $2 | 311 |
| ☐ | Item B | 3 | $1 | $3 | 312 |
| ☐ | Item C | 1 | $6 | $6 | 313 |
| ☐ | Item D | 3 | $3 | $9 | 314 |
| ☐ | Item E | 2 | $2 | $4 | 315 |
| ☐ | Item F | 1 | $5 | $5 | 316 |
| ☐ | Item G | 2 | $4 | $8 | 317 |

FIG. 3b

| | Description | Quantity | Price | Subtotal | |
|---|---|---|---|---|---|
| ☐ | Item A | 1 | $2 | $2 | 311 |
| ☐ | Item B | 3 | $1 | $3 | 312 |
| ☑ | Item C | 1 | $6 | $6 | 313 |
| ☐ | Item D | 3 | $3 | $9 | 314 |
| ☐ | Item E | 2 | $2 | $4 | 315 |
| ☐ | Item F | 1 | $5 | $5 | 316 |
| ☐ | Item G | 2 | $4 | $8 | 317 |

FIG. 3c

| | Description | Quantity | Price | Subtotal | |
|---|---|---|---|---|---|
| ☑ | Item C | 1 | $6 | $6 | 313 |
| ☐ | Item E | 2 | $2 | $4 | 315 |
| ☐ | Item F | 1 | $5 | $5 | 316 |
| ☐ | Item G | 2 | $4 | $8 | 317 |
| ☐ | Item H | 3 | $3 | $9 | 318 |
| ☐ | Item I | 3 | $1 | $3 | 319 |
| ☐ | Item J | 1 | $2 | $2 | 320 |

| | Description | Quantity | Price | Subtotal | |
|---|---|---|---|---|---|
| ☑ | Item C | 1 | $6 | $6 | 313 |
| ☑ | Item F | 1 | $5 | $5 | 316 |
| ☐ | Item I | 3 | $1 | $3 | 319 |
| ☐ | Item J | 1 | $2 | $2 | 320 |
| ☐ | Item K | 1 | $3 | $3 | 321 |
| ☐ | Item L | 2 | $4 | $8 | 322 |
| ☐ | Item M | 3 | $2 | $6 | 323 |

FIG. 5a

| | Description | Quantity | Price | Subtotal | |
|---|---|---|---|---|---|
| ☑ | Item C | 1 | $6 | $6 | 313 |
| ☑ | Item F | 1 | $5 | $5 | 316 |
| ☐ | Item G | 2 | $4 | $8 | 317 |
| ☐ | Item H | 3 | $3 | $9 | 318 |
| ☐ | Item I | 3 | $1 | $3 | 319 |
| ☐ | Item J | 1 | $2 | $2 | 320 |
| ☐ | Item K | 1 | $3 | $3 | 321 |

FIG. 5b

| | Description | Quantity | Price | Subtotal | |
|---|---|---|---|---|---|
| ☑ | Item C | 1 | $6 | $6 | 313 |
| ☐ | Item E | 2 | $2 | $4 | 315 |
| ☑ | Item F | 1 | $5 | $5 | 316 |
| ☐ | Item G | 2 | $4 | $8 | 317 |
| ☐ | Item H | 3 | $3 | $9 | 318 |
| ☐ | Item I | 3 | $1 | $3 | 319 |
| ☐ | Item J | 1 | $2 | $2 | 320 |

FIG. 5c

| | Description | Quantity | Price | Subtotal |
|---|---|---|---|---|
| ☑ | Item C | 1 | $6 | $6 |
| ☑ | Item F | 1 | $5 | $5 |
| ☐ | Item I | 3 | $1 | $3 |
| ☐ | Item J | 1 | $2 | $2 |
| ☐ | Item K | 1 | $3 | $3 |
| ☐ | Item L | 2 | $4 | $8 |
| ☐ | Item M | 3 | $2 | $6 |

FIG. 6a

| | Description | Quantity | Price | Subtotal |
|---|---|---|---|---|
| ☑ | Item C | 1 | $6 | $6 |
| ☑ | Item F | 1 | $5 | $5 |
| ☐ | Item I | 3 | $1 | $3 |
| ☐ | Item J | 1 | $2 | $2 |
| ☑ | Item K | 1 | $3 | $3 |
| ☐ | Item L | 2 | $4 | $8 |
| ☐ | Item M | 3 | $2 | $6 |

FIG. 6b

| | Description | Quantity | Price | Subtotal |
|---|---|---|---|---|
| ☑ | Item C | 1 | $6 | $6 |
| ☑ | Item F | 1 | $5 | $5 |
| ☑ | Item K | 1 | $3 | $3 |
| ☐ | Item L | 2 | $4 | $8 |
| ☐ | Item M | 3 | $2 | $6 |
| ☐ | Item N | 1 | $1 | $1 |
| ☐ | Item O | 2 | $2 | $4 |

| | Description | Quantity | Price | Subtotal |
|---|---|---|---|---|
| ☑ | Item C | 1 | $6 | $6 |
| ☑ | Item F | 1 | $5 | $5 |
| ☑ | Item K | 1 | $3 | $3 |

620

352, 452, 552
313, 316, 321

| | Description | Quantity | Price | Subtotal |
|---|---|---|---|---|
| ☐ | Item L | 2 | $4 | $8 |
| ☐ | Item M | 3 | $2 | $6 |
| ☐ | Item N | 1 | $1 | $1 |
| ☐ | Item O | 2 | $2 | $4 |
| ☐ | Item P | 1 | $2 | $2 |
| ☐ | Item Q | 3 | $1 | $3 |
| ☐ | Item R | 2 | $3 | $6 |

610

322, 323, 324, 325, 326, 327, 328

600

FOCUSING ON MULTIPLE SELECTED ROWS WITHIN A DATA TABLE

BACKGROUND

Data tables are configured to store data within a table format. Within a two-dimensional table, each row or column of the table can represent an object or item. Attributes of the object or item can be presented in the other dimension. Often times, a user may want to select multiple items within a data table to batch process the selected items. For example it is more efficient to select ten items within the data table and change the price of the tem items through a single action rather than performing ten actions to change the price of each item. However in batch processing, the user tends to lose focus on what has been previously selected during the selection process. This is because focus of previously selected items can be lost as the user scrolls through the data table to select additional items within the data table. This experience can be frustrating to the user.

SUMMARY

In one embodiment, a computer-implemented method presents, by a processor, a portion of a list of items within a first container, wherein the portion includes a first selected item. The method then detects, by the processor, a first user input representative of scrolling the list of items within the first container in a first scroll direction. The method then first scrolls, by the processor, the list of items in the first scroll direction within the first container to update the portion being presented until the first selected item is adjacent to a boundary of the first container. The method then generates, by the processor, a first locked item based on the first selected item. The method then fixes, by the processor, the first locked item along the boundary of the first container. The method then second scrolls, by the processor, the list of items within the first container, wherein the first locked item remains at a fixed position within the container as the list of items scroll through the remaining positions within the container.

In one example, the boundary of the first container is dependent on the first scroll direction.

In another example, the method further detects, by the processor, a second user input representative of scrolling the list of items in a second scroll direction that is opposite of the first scroll direction, scrolls, by the processor, the list of items in the second scroll direction within the first container to update the portion being presented until a next item to be introduced into the first container is the first selected item, determines, by the processor, that scrolling will add the first selected item to the portion being presented, and removes, by the processor, the first locked item from the first container in response to the determination.

In another example, each locked item reduces the portion being presented by one.

In another example, the method can further includes first detecting, by the processor, a second user input representative of selecting a second item from the portion being presented, second detecting, by the processor, a third user input representative of scrolling the list of items in the first scroll direction, third scrolling, by the processor, the list of items in the first scroll direction within the first container to update the portion being presented until the second selected item is adjacent the first locked item, generating, by the processor, a second locked item based on the second selected item, fixing, by the processor, the second locked item within the first container, and fourth scrolling, by the processor, the list of items within the first container, wherein the first locked item and the second locked item remain at fixed positions within the container as the list of items scroll through the remaining positions within the container. The first locked item can be positioned with respect to the second locked item according to their original positions within the list of items.

In another example, the method can further include determining, by the processor, that a predefined number of locked items have been fixed within the first container, generating, by the processor, a second container configured to present the locked items, and moving, by the processor, the locked items from the first container to the second container.

In another embodiment, a non-transitory computer readable storage medium stores one or more programs comprising instructions for presenting a portion of a list of items within a first container, wherein the portion includes a first selected item, detecting a first user input representative of scrolling the list of items within the first container in a first scroll direction, first scrolling the list of items in the first scroll direction within the first container to update the portion being presented until the first selected item is adjacent to a boundary of the first container, generating a first locked item based on the first selected item, fixing the first locked item along the boundary of the first container, and second scrolling the list of items within the first container, wherein the first locked item remains at a fixed position within the container as the list of items scroll through the remaining positions within the container.

In another embodiment, a computer implemented system comprises one or more computer processors and a non-transitory computer-readable storage medium. The non-transitory computer-readable storage medium comprises instructions, that when executed, control the one or more computer processors to be configured for presenting a portion of a list of items within a first container, wherein the portion includes a first selected item, detecting a first user input representative of scrolling the list of items within the first container in a first scroll direction, first scrolling the list of items in the first scroll direction within the first container to update the portion being presented until the first selected item is adjacent to a boundary of the first container, generating a first locked item based on the first selected item, fixing the first locked item along the boundary of the first container, and second scrolling the list of items within the first container, wherein the first locked item remains at a fixed position within the container as the list of items scroll through the remaining positions within the container.

The following detailed description and accompanying drawings provide a better understanding of the nature and advantages of the present disclosure.

BRIEF DESCRIPTION OF THE DRAWINGS

FIGS. 3a-c illustrate an example of locking an item along a boundary of the container according to one embodiment;

FIGS. 5a-5c illustrate an example of unlocking an item from the container according to one embodiment;

FIGS. 6a-6d illustrate an example of generating a pop-up container which hovers over the main container;

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples alone or in combination with other features described below, and may further include modifications and equivalents of the features and concepts described herein.

Described herein are techniques for visually displaying a data table within a container. The data table can store multiple items (or objects). Each item can include a plurality of attributes which are displayed across a dimension of the data table. For example, the items can be presented across the x-dimension of the data table while the attributes of the items are presented across the y-dimension of the data table, or vice versa. Often times, the number of items within the data table can be greater than the number of items that can be simultaneously presented within the display. As a result, a scroll action can be utilized by the user to examine the data table. A scroll action causes one or more items from the data table to exit the container while one or more items from the data table enter the container. In other words, the items cycle through the container where a predefined number of items are being presented simultaneously within the container. In one embodiment, the system can lock the position of selected items along a boundary of the container such that the selected items maintain a position within the container while other non-selected items cycle through the remaining viewable area of the container. In some embodiments, the system can automatically generate a second container that hovers over the original container when the number of locked selected items are greater than a specified number. The second container can present the locked selected items, thus freeing up space within the original container to present items within the data table in a scrolling fashion.

The system can be implemented on the client side or server side. For example, the system can be implemented on the client device and be configured to present the data table within one or more containers within the display. As another example, the system can be implemented on a server that is in communication with a client device. User input received on the client device can be transmitted from the client device to the server. The server can process the detected user input and update the one or more containers. Once updated, the server can transmit the updated containers to the client device. The client device can present the content received to the user.

Figure 1:
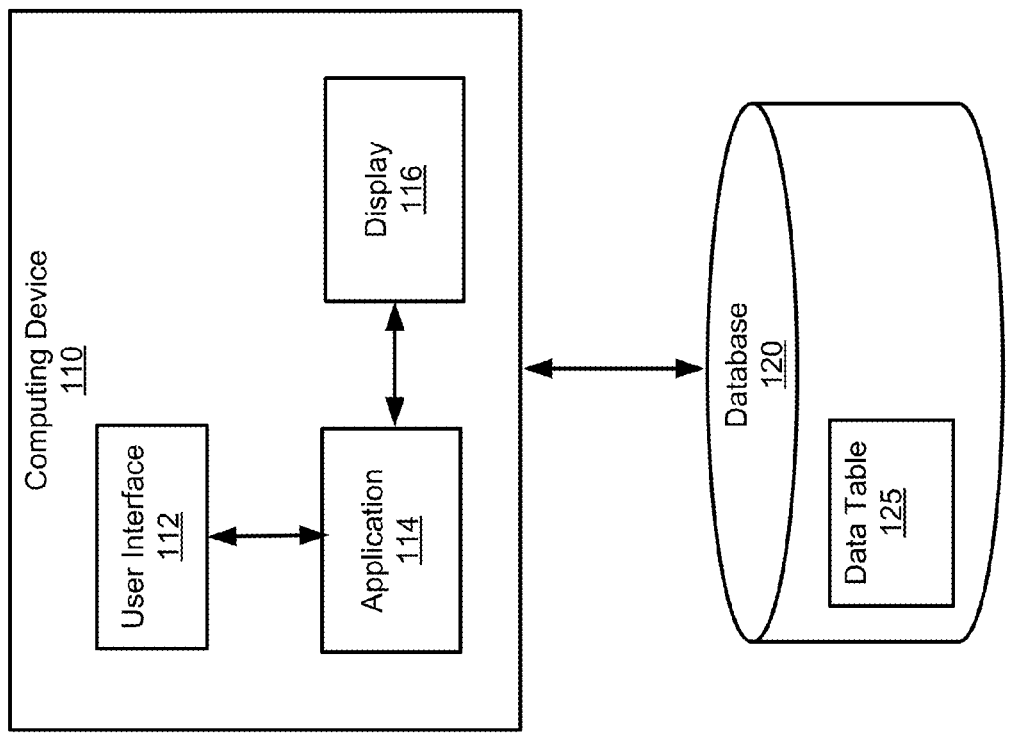
FIG. 1 illustrates a system for presenting content on a computing device according to one embodiment.

FIG. 1 illustrates a system for presenting content on a computing device according to one embodiment. System 100 includes computing device 110 and database 120. Database 120 can store content which includes data table 125. Data table 125 can be a two-dimensional table that stores a plurality of items across one dimension and the attributes of the plurality of items across another dimension. For example, each row of data table 125 can store data related to an item within database 120. Each column of data table 125 can be associated with an attribute of items stored within data table 125. Computing device 110 includes application 114 which can receive data table 125 from database 120 and process data table 125 for presentation on display 116. Based on user input received on user interface 112, a different presentation of data table 125 can be presented on display 116. Each presentation of data table 125 can present a portion of data table 125 within a container being presented within display 116. In one example, a presentation can present a segment of data table 125. A segment of data table 125 contains a plurality of items which appear consecutively in data table 125. Consecutive items are items which are stored next to one another within data table 125. In another example, a presentation can present a segment of data table 125 (which contains a plurality of consecutive items) along with one or more non-consecutive items from data table 125. The one or more non-consecutive items can be items which have been selected. A container can present the presentation within display 116.

In one embodiment, application 114 can present a portion of data table 125 in a container of display 116. Data table 125 can include an ordered list of items. An ordered list of items is a data structure where items within the list have a specified order. Based on the resolution and/or dimensions of display 116, application 114 can determine the number of items within data table 125 that can be simultaneously presented in display 116. In some embodiments, display 116 cannot display all the contents of data table 125 at one time. As a result, application 114 can configure the container to display a segment of consecutive items within data table 125 at the same time. When a scroll request is received, application 114 can update the segments of consecutive items displayed within the container. In one embodiment, the items being displayed within the container can be animated as new items enter the container and old items exit the container. In some embodiments, application 114 can lock selected items which are not part of the segment of consecutive items being displayed so that the selected items remain visible within the container. The non-locked items being displayed within the container can continue to scroll in and out of the container while the locked items remained in a fixed position within the container. As described above, application 114 can scroll through items within data table 125 such that an item (not currently being presented within the container) enters the container as another item (currently being presented within the contain) leaves the container, thus allowing a user to review the contents of the data table 125 in the container one segment at a time.

Figure 2:
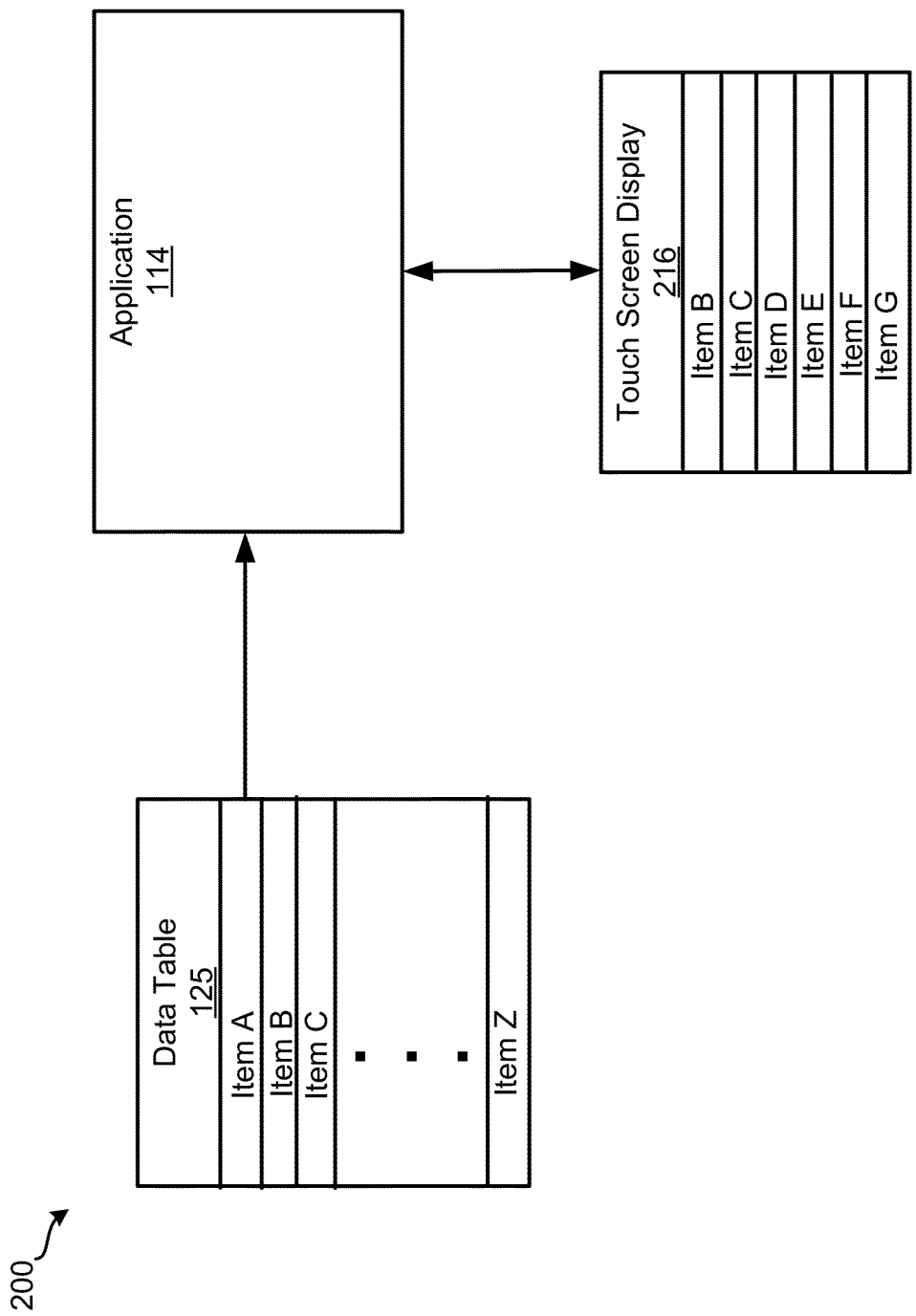
FIG. 2 illustrates a system for displaying items within a data table on a touch screen display according to one embodiment.

FIG. 2 illustrates a system for displaying items within a data table on a touch screen display according to one embodiment. System 200 includes application 114, data table 125, and touch screen display 216. Application 114 is configured to receive data table 125. In other embodiments, application 114 can receive other data tables having different formats, such as data tables where items are ordered horizontally rather than vertically. As shown, data table 125 can include 26 items (one item corresponding to each letter in the alphabet), from item A through item Z.

Touch screen display 216 is configured to display a plurality of items from data table 125. Here, touch screen display 216 is configured to display six items at a time from data table 125. Currently items, "B" through "G" are being displayed on touch screen display 216. Application 214 can be in communication with touch screen display 216. In response to receiving a touch event on touch screen display 216, application 114 can process the touch event and scroll through the items within data table 125 such that a different group of six items are being displayed on touch screen display 216. For example if a touch event that is associated with scrolling forward three items is received, application 114 can scroll forward three items from data table 125, thus resulting in items "E" through "J" being displayed on touch screen display 216. FIGS. 3-6 illustrate exemplary containers for presenting data table 125 according to some embodiments.

FIGS. 3*a-c* illustrate an example of locking an item along a boundary of the container according to one embodiment. Touch screen display 300 is presenting container 310. FIG. 3*a* illustrates an action for selecting an item within the container according to one embodiment. Container 310 is currently presenting items 311-317, which correspond to items "A" through "G." Items 311-317 are consecutive items which appear in the data table. In this embodiment, each item is presented as a row within container 310. However, in other embodiments, each item can be presented as a column within container 310. Each row can present a plurality of attributes which are associated with the item being presented within the row. Here, each row can present a selection field describing whether the associated item has been selected, a description field describing the name of the associated item (e.g., item name), a quantity field describing the quantity of the associated that is included in the data table, a price field describing the per-item price of the associated item, and a subtotal field describing the total cost given the quantity of the associated item that is included in the data table. For example, row 313 describes an item within the data table titled "Item C." There is only one item and the item price is $6, which brings the subtotal for the item to $6. The item has not been selected as indicated by the empty checkmark box.

Here, touch event 351 has been detected on an attribute of item 313 being presented within container 310. Touch event 351 is detected on the selection field of item 313. In other embodiments, touch event 351 can be detected on other attributes of row 313 (e.g., description field, quantity field, price field, subtotal field). In response to the touch event, the application can store data specifying that item 313 has been selected. In one embodiment, the application can update the data table to indicate that item 313 has been selected. In another embodiment, the application can manage a selection table that indicates which items have been selected from the data table. The application can also update container 310 to include a visual indicator to indicate that item 313 has been selected.

FIG. 3*b* illustrates an action for scrolling through items within the container according to one embodiment. As shown here, container 310 includes visual indicator 352 to signify that item 313 has been selected. In other embodiments, the visual indicator can be a change in the appearance of the row within container 310 that corresponds to item 313. For example, the color, hue, or otherwise the visual appearance of the row that corresponds to item 313 can change to indicate that item 313 has been selected. Here, touch event 353 has been detected within container 310. Touch event 353 is a touch and swipe gesture that is detected on the touch screen display. In one example, the touch and swipe gesture can be detected within the boundaries of the container. The application can interpret touch event 353 as an instruction to scroll through items within the data table. Depending on the orientation and speed of the swipe, the application can scroll the contents of the data table into and out of the container. Here, touch event 353 is a touch and swipe gesture pointing north. The application can interpret touch event 353 and in response, scroll items within the data table into container 310. Since the swipe direction was north, the application can introduce subsequent items in the data table that appear after item 317 into container 310 as older items are removed from container 310. Herein, older items are described as items which appear towards the top of the data table while newer items are described as items which appear towards the bottom of the data table.

FIG. 3*c* illustrates a container according to one embodiment. In response to touch event 353, the application can scroll through the items within the data table, thereby updating the contents of container 310 such that items 311 and 312 have been removed from container 310 as items 318 and 319 are introduced into container 310. In one embodiment, the application can monitor the position of selected items within the data table. As item 313 reaches the boundary of container 310 (e.g., the top edge of the space within container 310 that is configured to display items of the data table), the application can determine that the removal of item 313 from container 310 is imminent. Based on the location of item 313, the selection field of item 313, and the scroll direction, the application can lock item 313 along a boundary of container 310. Locking an item along a boundary means that item 313 remains at a fixed position within container 310 while other items scroll. As a result, item 313 remains visible within container 310, regardless of scrolling. Advantages of locking selected items along a boundary of the container is that selected items remain visible, thus allowing a user to retain focus on selected items during scrolling. This may be desirable to users since it allows users to collectively review selected items. Selected items can be all viewed simultaneously within the container, thus allowing the user to scroll and review items within the data table without losing focus on previously selected items. In some embodiments, the boundary of the container which the selected item is locked to can depend on the scroll direction. If items are being scrolled such that items enter the container at the top and exit at the bottom, then the boundary which selected items are locked to can be the bottom boundary of the container. If items are being scrolled such that items enter the container at the bottom and exit at the top, then the boundary which selected items are locked to can be the top boundary of the container. If items are being scrolled such that items enter the container at the left and exit at the right, then the boundary which selected items are locked to can be the right boundary of the container. If items are being scrolled such that items enter the container at the right and exit at the left, then the boundary which selected items are locked to can be the left boundary of the container. Essentially, the boundary which items exit the container can depend on the scroll direction. The boundary which items exit the container can also be the boundary which selected items are locked to.

In one embodiment, the application can add an item being displayed within the container to a watch list when the item is selected. The application can monitor items within the watch list to determine when the items approach a boundary of container 310 or approach a locked item within container 310. In one example, approach can be when the item is adjacent to a boundary, is in contact with a boundary, or is about to be in contact with the boundary. When the application detects that a selected item is abutting the boundary of container 310 or a locked item, the application can lock the selected item to its last position before exiting container 310. For example if the last position of the selected item before exiting container 310 is abutting a boundary of container 310, then the application can lock the selected item so that the selected item abuts the boundary. As another example if the last position of the selected item before exiting container 310 is abutting a locked item within container 310, then the application can lock the selected item so that the selected item abuts the locked item. As a result, the container can include two locked items that abut one another.

Once an item is locked within container 310, the application can present the locked item within container 310 regardless of scrolling. In one embodiment, a locked item can remain at a fixed position within container 310. Here, item 313 is a locked item. The application can fix the position of item 313 to its position in FIG. 3c. When the application processes scroll requests, the application can scroll the consecutive list of items being displayed in container 310 without changing the position of item 313. As a result, the available space within container 310 that is dedicated to scrolling has been reduced by the space used to display the fixed item 313. As a result, container 310 can include a consecutive list of items plus one or more non-consecutive locked items (which are previously selected items that, if displayed consecutively, would not be able to be presented simultaneously in container 310 due to size constraints of the container). Here, scrolling has removed item 314 from container 310 and introduced item 320. However, item 313 (which is older than item 314) remains within container 310 at a fixed position that abuts the top boundary of container 310 since item 313 is a locked item. Thus, container 310 includes item 313 (fixed) and items 315-320 (which are consecutive list of items). In some embodiments, locked items can be highlighted to distinguish the locked items and unlocked items. This can be particularly useful when separating selected locked items and selected unlocked items. In other embodiments, other visual indicators such as colors, patterns, or hues can be used to distinguish the difference between locked and unlocked items. In yet other embodiments, locked and unlocked items can have the same appearance to simplify the appearance of container 510.

Figure 4A:
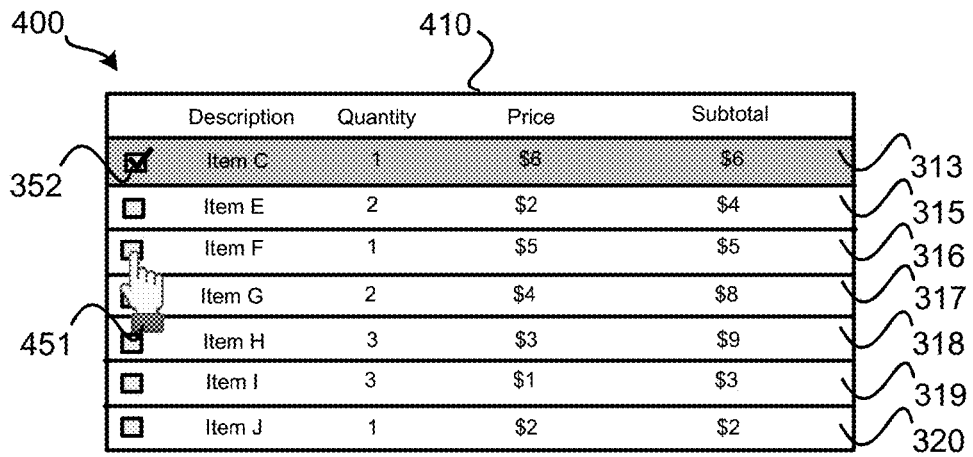
FIGS. 4a-4c illustrate an example of locking a second item within the container according to one embodiment.
Figure 4B:
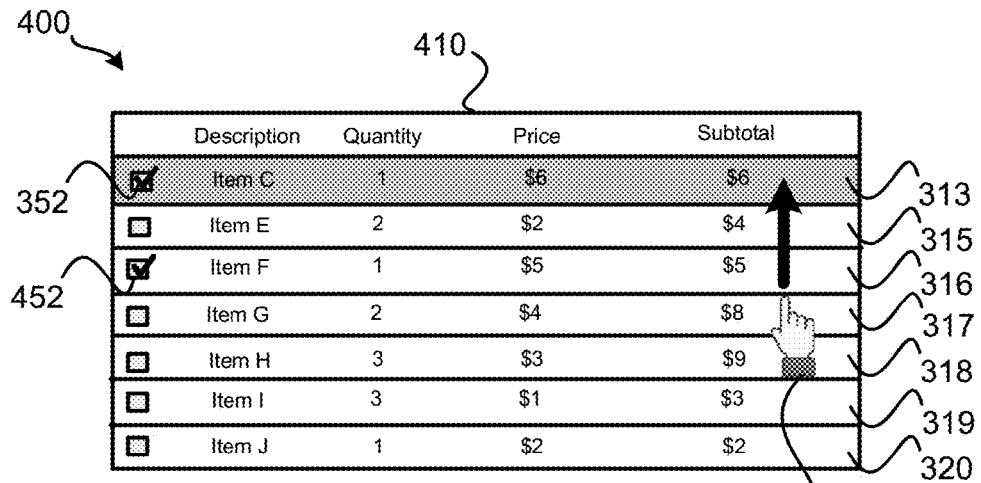
Figure 4C:
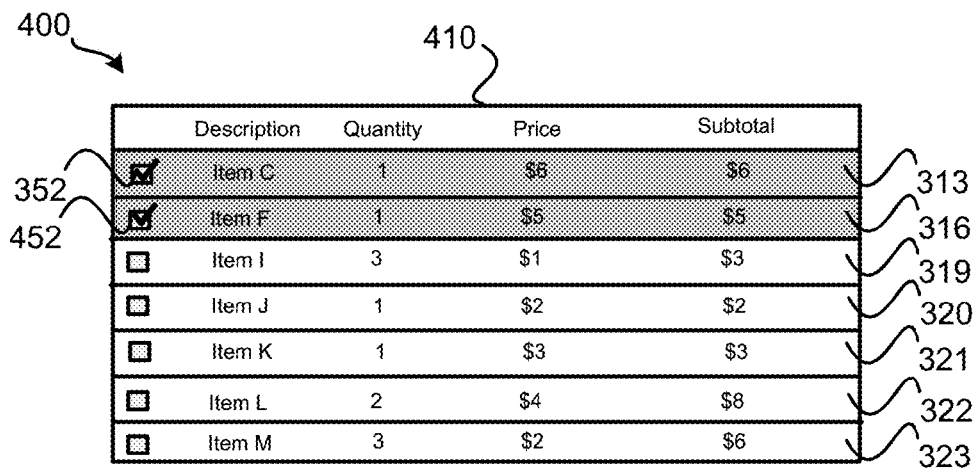

In some embodiments, more than one selected item can become locked within the container. FIGS. 4a-4c illustrate an example of locking a second item within the container according to one embodiment. As described above, multiple selected items can become locked along a boundary of the container. Each consecutive locked item can abut an existing locked item, thus creating a chain of locked items. FIG. 4a illustrates an action for selecting an item within the container according to one embodiment. As shown, touch screen display 400 is displaying container 410. Item 313 was previously selected and is locked within the northern boundary of container 410. Item 313 is designated as a selected item based on visual indicator 352 and is designated as being in a locked state based on the grey tone highlighting. The application detects touch event 451 on item 316. As a result, item 313 is a selected item which is locked within container 410 and item 316 is a selected item within the list of consecutive items being presented in container 410.

FIG. 4b illustrates an action for scrolling through items within the container according to one embodiment. As shown here, container 410 includes visual indicator 352 to signify that item 313 has been selected and visual indicator 452 to signify that item 316 has been selected. In other embodiments, the visual indicator can be a change in the appearance of the row within container 310 that corresponds to item 313. For example, the color, hue, or otherwise the visual appearance of the row that corresponds to item 313 can change to indicate that item 313 has been selected. Here, touch event 453 has been detected within container 410. Touch event 453 is a touch and swipe gesture that is detected on the touch screen display. In one example, the touch and swipe gesture can be detected within the boundaries of the container. The application can interpret touch event 453 as an instruction to scroll through items within the data table. Depending on the orientation and speed of the swipe, the application can scroll the contents of the data table into and out of the container. Here, touch event 453 is a touch and swipe gesture pointing north. The application can interpret touch event 453 and in response, scroll items within the data table into container 410. Since the swipe direction was north, the application can introduce subsequent items in the data table that appear after item 320 into container 410 as older items are removed from container 410.

FIG. 4c illustrates a container according to one embodiment. In one example, the container can be presented in response to the touch and swipe gesture described in FIG. 4b. As shown, the application has interpreted the touch and swipe gesture by scrolling through the items within the data table. Item 313 which is already locked within container 410 remains at a fixed position in container 410 (e.g., the first position) while consecutive items within the data table scroll through the remaining space in container 410. Here, item 315 has exited container 410 due to scrolling while item 321 has entered container 410. The application can detect that selected item 316 is next to item 313 due to scrolling and that selected item 316 is about to exit container 410 if scrolling continues. Here, touch event 453 has been interpreted by the application as a request to scroll north where consecutive items enter container 410 at the bottom and exit container 410 at the top. As a result, the application can detect that item 316 is about to exit container 410 at the top.

In response to detecting that selected item 316 is about to exit container 410 (for example due to scrolling), the application can lock item 316 within container 410. In one embodiment, the application can set item 316 to a locked state. When item 316 is in a locked state, the application can fix item 316 to a predefined position within container 410. Here, the application fixes the position of item 316 to the second position within container 410, which is also known as locking the position of item 316 to the second position. Item 313 is locked to the first position. Since items 313 and 316 are locked to the first position and second position, respectively, the application can limit scrolling to the remaining positions. When a scrolling request is processed, the application can lock item 313 and item 316 at their current locations within container 410 and scroll items 319-323. Locked items can be highlighted to distinguish the locked items and unlocked items. This can be particularly useful when separating selected locked items and selected unlocked items. Highlighting can assist a user in distinguish the items which are scrollable versus the items which are locked. In other embodiments, other visual indicators such as colors, patterns, or hues can be used to distinguish the difference between locked and unlocked items. In yet other embodiments, locked and unlocked items can have the same appearance to simplify the appearance of container 410.

Locked items can remain locked until scrolling results in the locked item appearing in the consecutive list of items being displayed in the container. Once scrolling has resulted in the locked item appearing in the consecutive list of items, the application can unlock the locked item. Thus, the item becomes selected but not locked. When unlocked, the selected item can freely scroll within the container. In other words, scrolling can move the selected item around the container. FIGS. 5a-5c illustrate an example of unlocking an item from the container according to one embodiment.

FIG. 5a illustrates an example of detecting a scroll request according to one embodiment. The application can detect touch event 551 as a touch and swipe gesture. For example, the gesture can be the user touching the touch screen display followed by the user swiping in a direction on the touch screen display. The speed and orientation of the swipe can cause be translated by the application into a scroll request having a specified speed and direction. Here, the application can interpret touch event 551 as a scroll request to scroll south four items within the data table where consecutive items enter container 510 at the top and exit container 510 at the bottom. Items 313 and 316 are selected items which have been locked within container 510. Here, locked items have been highlighted using a greyish tone to distinguish the locked items from the unlocked items. In other embodiments, other visual indicators such as colors, patterns, or hues can be used to distinguish the difference between locked and unlocked items. In yet other embodiments, locked and unlocked items can have the same appearance to simplify the appearance of container 510.

FIG. 5b illustrates an example of scrolling through a data table according to one embodiment. The application can scroll through the data table in response to touch event 551 of FIG. 5a. As shown, the application has scrolled two items into container 510 (items 317 and 318) and scrolled two items out of container 510 (items 322 and 323). During scrolling, items 313 and 316 remain fixed in their positions within container 510 since these items have been locked. Locked items have been highlighted with a greyish tone to identify them from unlocked items.

FIG. 5c illustrates an example of unlocking an item within the container according to one embodiment. FIG. 5c can be a continuation of the scrolling from FIG. 5b which can be a result of the scroll request from FIG. 5a. Here, the application has scrolled two items into container 510 (items 315 and 316) and scrolled two items out of container 510 (items 322 and 323). During scrolling, item 316 can be introduced into the consecutive list of items being displayed within the container. When the application detects that a locked item is being introduced into the consecutive list of items, the application can unlock the item, thus freeing an additional space within the container for the scrolling of consecutive items. In one embodiment, the application can un-highlight a locked item that becomes unlocked to visually signify that the item has become unlocked. As shown here, item 316 is no longer highlighted to clarify that item 316 has become unlocked. As a result, item 313 is a locked item within container 510 while items 315-320 are a consecutive list of items which can change due to scrolling.

FIGS. 6a-6d illustrate an example of generating a pop-up container which hovers over the main container. The pop-up container can be configured to present locked items thus allowing locked items to be removed from the main container. By removing the locked items from the main container, the main container has additional space that can be utilized during scrolling of items from the data table. In some embodiments, the application can generate the pop-up container in response to detecting a predefined number of items being locked within the main container. For example, the application can generate the pop-up container in response to a predefined condition of detecting that the main container includes five locked items. When the predefined condition is detected, the application can populate the pop-up container with the five locked items from the main container and remove the five locked items from the main container. This can increase the amount of space that is available for presenting scrolled items in the main container.

FIG. 6a illustrates an action for selecting an item within the container according to one embodiment. As shown, touch screen display 600 is displaying container 610. Items 313 and 316 were previously selected and are locked within the northern boundary of container 610. Item 313 is designated as a selected item based on visual indicator 352. Similarly, item 316 is selected based on visual indicator 452. The application detects touch event 651 on item 321. As a result, item 313 and 316 are selected items which were locked within container 610 and item 321 is a selected item within the list of consecutive items being presented in container 610. Locked items can be highlighted to distinguish the locked items and unlocked items. This can be particularly useful when separating selected locked items and selected unlocked items. In other embodiments, other visual indicators such as colors, patterns, or hues can be used to distinguish the difference between locked and unlocked items. In yet other embodiments, locked and unlocked items can have the same appearance to simplify the appearance of container 510.

FIG. 6b illustrates an action for scrolling through items within the container according to one embodiment. As shown here, container 610 includes visual indicator 352 to signify that item 313 has been selected, visual indicator 452 to signify that item 316 has been selected, and visual indicator 552 to indicate that item 321 has been selected. In other embodiments, the visual indicator can be a change in the appearance of the row within container 310 that corresponds to item 313. For example, the color, hue, or otherwise the visual appearance of the row that corresponds to item 313 can change to indicate that item 313 has been selected. Here, touch event 653 has been detected within container 410. Touch event 453 is a touch and swipe gesture that is detected on the touch screen display. In one example, the touch and swipe gesture can be detected within the boundaries of the container. The application can interpret touch event 653 as an instruction to scroll through items within the data table. Depending on the orientation and speed of the swipe, the application can scroll the contents of the data table into and out of the container. Here, touch event 653 is a touch and swipe gesture pointing north. The application can interpret touch event 653 and in response, scroll items within the data table into container 610. Since the swipe direction was north, the application can introduce subsequent items in the data table that appear after item 323 into container 610 as older items are removed from container 610. For example, the introduction of a subsequent item from the data table based on the scroll direction can remove item 319 from container 610.

FIG. 6c illustrates a container according to one embodiment. In one example, the container can be presented in response to the touch and swipe gesture described in FIG. 6b.

As shown, the application has interpreted the touch and swipe gesture by scrolling through the items within the data table. Items 313 and 316 remain at a fixed position within contain 610 due to their locked state while consecutive items within the data table scroll through the remaining space in container 610. Here, items 319 and 320 have exited container 610 due to scrolling while items 324 and 325 have entered container 610. The application can detect that selected item 321 is next to item 316 due to scrolling and that selected item 321 is about to exit container 610 if scrolling continues. As a result, the application can lock item 321 to container 610.

In some embodiments, the application can generate a pop-up container to store fixed items that appear within container 610 in order to free up additional space for scrolling items within container 610. In one embodiment, the application can detect whether the number of locked items is greater than a predefined threshold (e.g., three fixed items). If the number of fixed items becomes more than the predefined threshold, the application can generate the pop-up container. The pop-up container can be a container which looks similar to main container. FIG. 6d illustrates a container with a pop-up container according to one embodiment. Here, touch screen display 600 includes main container 610 and pop-up container 620. The application can generate pop-up container 620 in response to detecting that main container 610 has a predefined threshold of fixed items. Here, the predefined threshold is three fixed items. In one embodiment, pop-up container 620 can look similar or substantially similar to main container 610. Here, the application has generated pop-up container 620 to include the same fields as main container 610. However, pop-up container 620 has a smaller width dimension to help distinguish pop-up container 620 from main container 610. Furthermore, the application has highlighted the fixed items within pop-up container 620 to identify the items as being fixed items. In other embodiments, the fixed items within pop-up container 620 can have no highlighting since the placement of the items within pop-up container 620 can identify the items as being fixed items. With the generation of pop-up container 620, the space available within main container 610 for scrolling items has increased. As a result, additional items can be presented within container 610. Here, the application has introduced items 326, 327, and 328 into container 610 without removing any items since additional space was available due to the removal of the fixed items.

As additional selected items from main container 610 approach the boundaries of main container 620, the selected items can become fixed selected items and presented within pop-up container 620. Similarly as fixed selected items enter into main container 610 due to scrolling, the selected item can become unfixed and thus removed from pop-up container 620. In one embodiment, pop-up container 620 can remain within touch screen display 600 until a predefined threshold of fixed items are present. The predefined threshold for introducing pop-up container 620 can be the same or different than the predefined threshold for removing pop-up container 620. For example, the predefined threshold for introducing the pop-up container can be three fixed items while the predefined threshold for removing the pop-up container can be one fixed item. When removing a pop-up container, the application can present the remaining items within the pop-up container along a boundary of the main container. Thus, the fixed items remain visible within touch screen display 600 (just simply moved from the pop-up container to the main container). In one example, the pop-up container can hover over the main container and the application can move the pop-up container in response to user input (such as a select and move gesture performed on the pop-up container).

Figure 7:
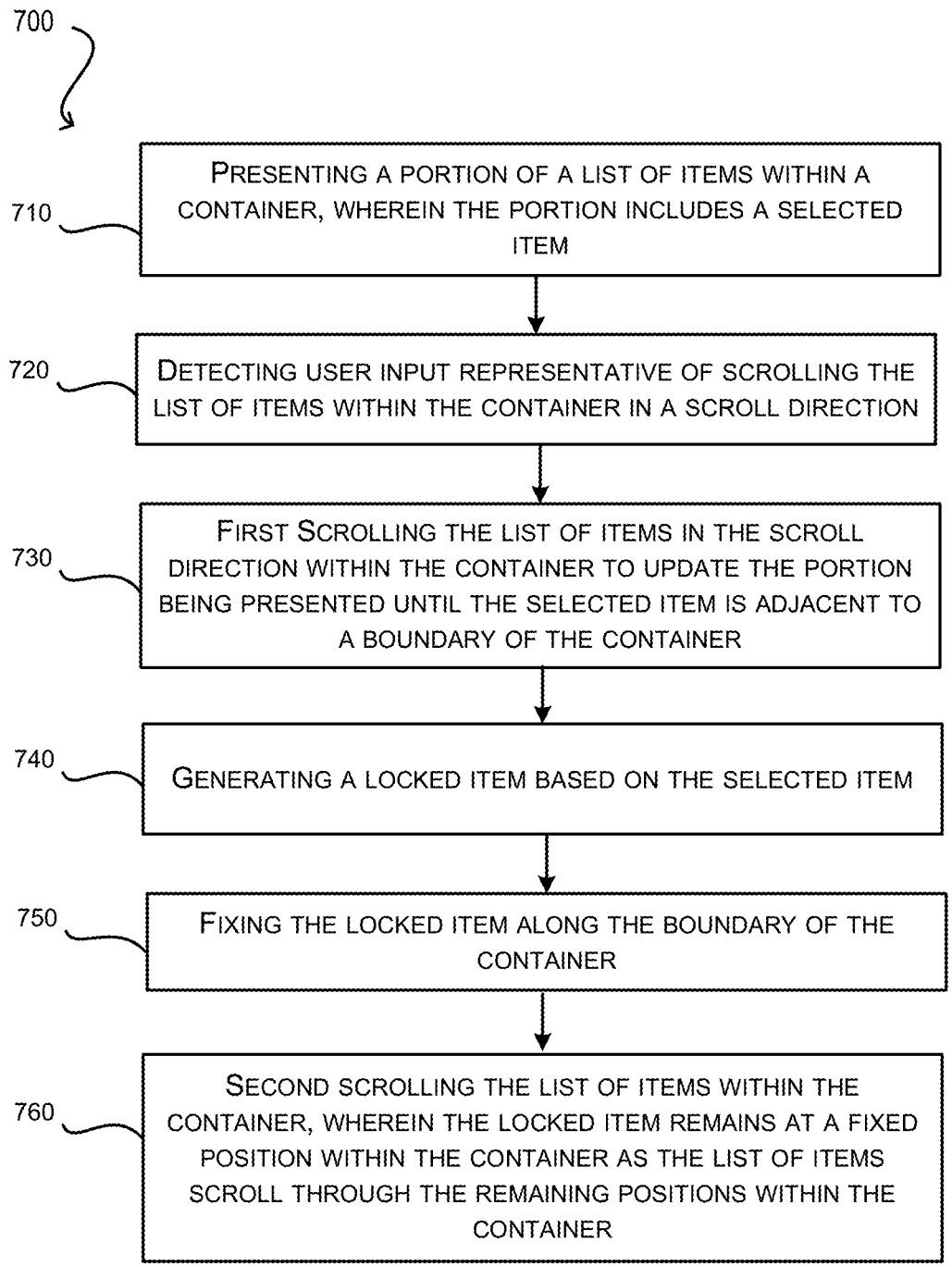
FIG. 7 illustrates a process for scrolling through a collection of ordered items according to one embodiment.

FIG. 7 illustrates a process for scrolling through a collection of ordered items according to one embodiment. Process 700 can be stored in computer readable code and executed by a processor. For example, process 700 can be part of the computer readable code that is part of application 114 and executed by computing device 110 of FIG. 1. Process 700 can begin by presenting a portion of a list of items within a container, wherein the portion includes a selected item at 710. The portion presented can be consecutive items which appear within the list of items. For example, the portion can contain items which are stored next to one another in a data table. Process 700 can continue by detecting user input representative of scrolling the list of items within the container in a scroll direction at 720. The user input can be received on a touch screen display or on another peripheral device that is in communication with the processor. In one example, the user input can specify the direction and amount to scroll based on the orientation and speed of a touch and swipe gesture. Once the user input is detected, process 700 can continue by first scrolling through the list of items in the scroll direction within the container to update the portion being presented until the selected item is adjacent to a boundary of the container at 730. In one example, process 700 can monitor the position of items which have been selected within the portion being presented. Once the position of a selected item is adjacent or in contact with a boundary of the container, the selected item is about be removed from the container due to scrolling. Thus, the process can detect when a selected item is about to become not visible within the container.

Process 700 then continues by generating a locked item based on the selected item at 740. The locked item can take on the same appearance as the selected item. In one example, the locked item can store an identifier of the selected item and can take on an appearance that is substantially similar to the selected item. Process 700 can then continue by fixing the locked item along the boundary of the first container at 750. In one example, the locked item can be fixed in a position which abuts or is adjacent to the boundary. Once fixed, the locked item can remain at the position within the container, even during scrolling. Process 700 can continue by second scrolling the list of items within the container, wherein the locked item remains at a fixed position within the container as the list of items scroll through the remaining positions within the container at 760. In one example, the fixed item can remain at a fixed position on the top (or bottom) boundary of the container. During scrolling, the portion of the list of items being presented within the container is updated. However, the fixed item remains at the fixed position. Since the fixed item remains at the fixed position, there is one less slot or position available within the container for scrolling through the list of items.

Figure 8:
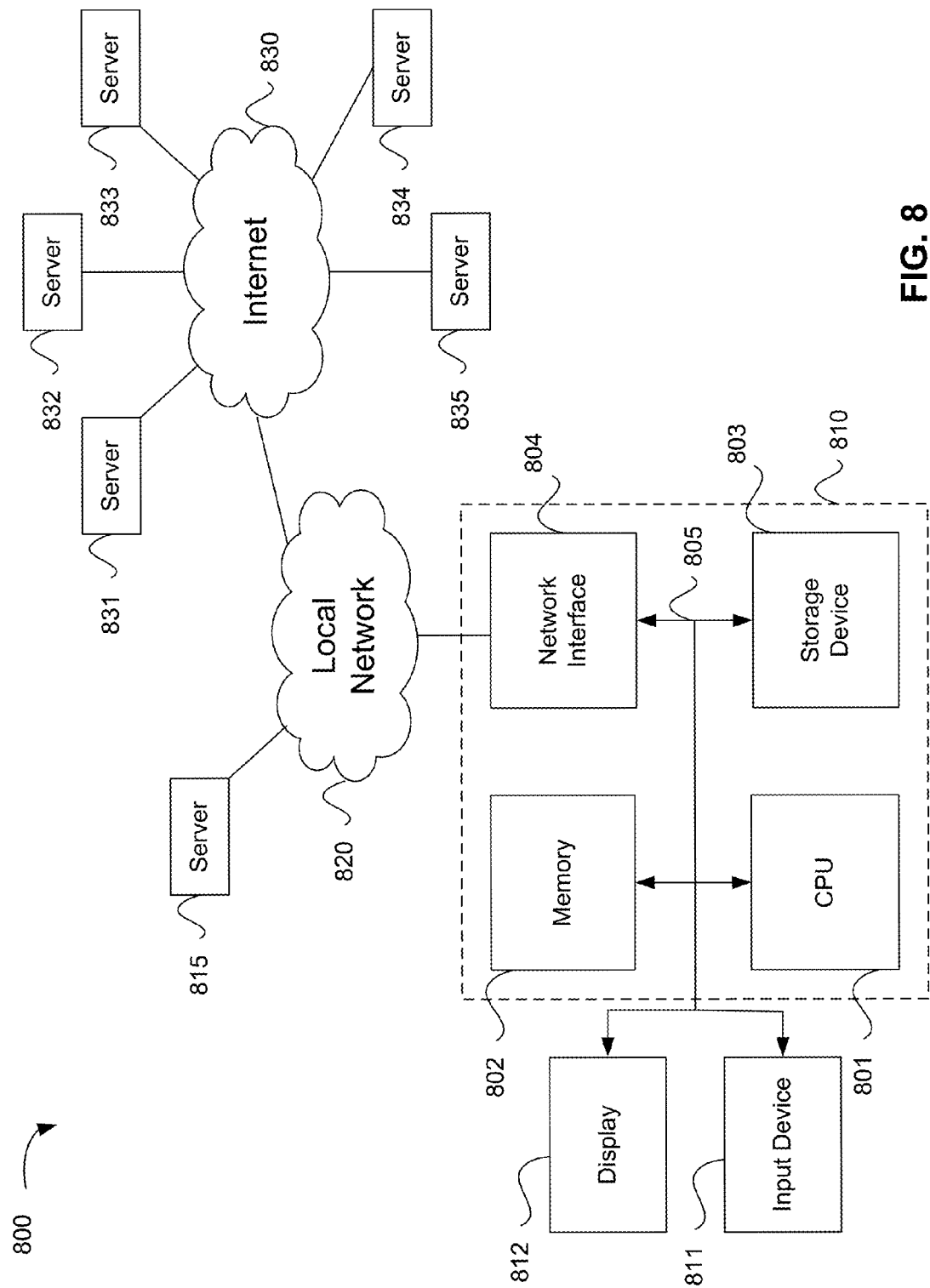
FIG. 8 illustrates an exemplary computer system according to one embodiment.

An exemplary computer system 800 is illustrated in FIG. 8. Computer system 810 includes a bus 805 or other communication mechanism for communicating information, and a processor 801 coupled with bus 805 for processing information. Computer system 810 also includes memory 802 coupled to bus 805 for storing information and instructions to be executed by processor 801, including information and instructions for performing the techniques described above, for example. This memory may also be used for storing variables or other intermediate information during execution of instructions to be executed by processor 801. Possible implementations of this memory may be, but are not limited to, random access memory (RAM), read only memory (ROM), or both. A storage device 803 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 803 may include source code, binary code, or software files for performing the techniques above, for example. Storage device and memory are both examples of computer readable mediums.

Computer system 810 may be coupled via bus 805 to a display 812, such as a cathode ray tube (CRT) or liquid crystal display (LCD), for displaying information to a computer user. An input device 811 such as a keyboard and/or mouse is coupled to bus 805 for communicating information and command selections from the user to processor 801. The combination of these components allows the user to communicate with the system. In some systems, bus 805 may be divided into multiple specialized buses.

Computer system 810 also includes a network interface 804 coupled with bus 805. Network interface 804 may provide two-way data communication between computer system 810 and the local network 820. The network interface 804 may be a digital subscriber line (DSL) or a modem to provide data communication connection over a telephone line, for example. Another example of the network interface is a local area network (LAN) card to provide a data communication connection to a compatible LAN. Wireless links are another example. In any such implementation, network interface 804 sends and receives electrical, electromagnetic, or optical signals that carry digital data streams representing various types of information.

Computer system 810 can send and receive information, including messages or other interface actions, through the network interface 804 across a local network 820, an Intranet, or the Internet 830. For a local network, computer system 810 may communicate with a plurality of other computer machines, such as server 815. Accordingly, computer system 810 and server computer systems represented by server 815 may form a cloud computing network, which may be programmed with processes described herein. In the Internet example, software components or services may reside on multiple different computer systems 810 or servers 831-835 across the network. The processes described above may be implemented on one or more servers, for example. A server 831 may transmit actions or messages from one component, through Internet 830, local network 820, and network interface 804 to a component on computer system 810. The software components and processes described above may be implemented on any computer system and send and/or receive information across a network, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
   presenting, by a processor, a portion of a list of items within a first container, wherein the portion includes a first selected item;
   detecting, by the processor, a first user input representative of scrolling the list of items within the first container in a first scroll direction;
   first scrolling, by the processor, the list of items in the first scroll direction within the first container to update the portion being presented until the first selected item is adjacent to a boundary of the first container;
   generating, by the processor, a first locked item based on the first selected item;
   fixing, by the processor, the first locked item along the boundary of the first container;
   second scrolling, by the processor, the list of items within the first container, wherein the first locked item remains at a fixed position within the container as the list of items scroll through the remaining positions within the container;
   first detecting, by the processor, a second user input representative of selecting a second item from the portion being presented;
   second detecting, by the processor, a third user input representative of scrolling the list of items in the first scroll direction;
   third scrolling, by the processor, the list of items in the first scroll direction within the first container to update the portion being presented until the second selected item is adjacent the first locked item;
   generating, by the processor, a second locked item based on the second selected item becoming adjacent to the first locked item;
   fixing, by the processor, the second locked item within the first container; and
   fourth scrolling, by the processor, the list of items within the first container, wherein the first locked item and the second locked item remain at fixed positions within the container as the list of items scroll through the remaining positions within the container.

2. The computer-implemented method of claim 1, wherein the boundary of the first container is dependent on the first scroll direction.

3. The computer-implemented method of claim 1, further comprising:
   scrolling, by the processor, the list of items in a second scroll direction opposite to the first scroll direction within the first container to update the portion being presented until a next item to be introduced into the first container is the first selected item;
   determining, by the processor, that scrolling will add the first selected item to the portion being presented; and
   removing, by the processor, the first locked item from the first container in response to the determination.

4. The computer-implemented method of claim 1, wherein each locked item reduces the portion being presented by one.

5. The computer-implemented method of claim 1, wherein the first locked item is positioned with respect to the second locked item according to their original positions within the list of items.

6. The computer-implemented method of claim 1, further comprising:
   determining, by the processor, that a predefined number of locked items have been fixed within the first container;
   generating, by the processor, a second container configured to present the locked items; and
   moving, by the processor, the locked items from the first container to the second container.

7. A non-transitory computer readable storage medium storing one or more programs, the one or more programs comprising instructions for:
   presenting a portion of a list of items within a first container, wherein the portion includes a first selected item;
   detecting a first user input representative of scrolling the list of items within the first container in a first scroll direction;
   first scrolling the list of items in the first scroll direction within the first container to update the portion being presented until the first selected item is adjacent to a boundary of the first container;
   generating a first locked item based on the first selected item;

fixing the first locked item along the boundary of the first container;
second scrolling the list of items within the first container, wherein the first locked item remains at a fixed position within the container as the list of items scroll through the remaining positions within the container;
first detecting a second user input representative of selecting a second item from the portion being presented;
second detecting a third user input representative of scrolling the list of items in the first scroll direction;
third scrolling the list of items in the first scroll direction within the first container to update the portion being presented until the second selected item is adjacent to the first locked item;
generating a second locked item based on the second selected item becoming adjacent to the first locked item;
fixing the second locked item within the first container; and
fourth scrolling the list of items within the first container, wherein the first locked item and the second locked item remain at fixed positions within the container as the list of items scroll through the remaining positions within the container.

8. The non-transitory computer readable storage medium of claim 7, wherein the boundary of the first container is dependent on the first scroll direction.

9. The non-transitory computer readable storage medium of claim 7, further comprising:
scrolling the list of items in a second scroll direction opposite to the first scroll direction within the first container to update the portion being presented until a next item to be introduced into the first container is the first selected item;
determining that scrolling will add the first selected item to the portion being presented; and
removing the first locked item from the first container in response to the determination.

10. The non-transitory computer readable storage medium of claim 7, wherein each locked item reduces the portion being presented by one.

11. The non-transitory computer readable storage medium of claim 7, wherein the first locked item is positioned with respect to the second locked item according to their original positions within the list of items.

12. The non-transitory computer readable storage medium of claim 7, further comprising:
determining that a predefined number of locked items have been fixed within the first container;
generating a second container configured to present the locked items; and
moving the locked items from the first container to the second container.

13. A computer implemented system comprising:
one or more computer processors; and
a non-transitory computer-readable storage medium comprising instructions, that when executed, control the one or more computer processors to be configured for:
presenting a portion of a list of items within a first container, wherein the portion includes a first selected item;
detecting a first user input representative of scrolling the list of items within the first container in a first scroll direction;
first scrolling the list of items in the first scroll direction within the first container to update the portion being presented until the first selected item is adjacent to a boundary of the first container;
generating a first locked item based on the first selected item;
fixing the first locked item along the boundary of the first container;
second scrolling the list of items within the first container, wherein the first locked item remains at a fixed position within the container as the list of items scroll through the remaining positions within the container;
first detecting a second user input representative of selecting a second item from the portion being presented;
second detecting a third user input representative of scrolling the list of items in the first scroll direction;
third scrolling the list of items in the first scroll direction within the first container to update the portion being presented until the second selected item is adjacent to the first locked item;
generating a second locked item based on the second selected item becoming adjacent to the first locked item;
fixing the second locked item within the first container; and
fourth scrolling the list of items within the first container, wherein the first locked item and the second locked item remain at fixed positions within the container as the list of items scroll through the remaining positions within the container.

14. The computer implemented system of claim 13, wherein the boundary of the first container is dependent on the first scroll direction.

15. The computer implemented system of claim 13, further comprising:
scrolling the list of items in the second scroll direction opposite to the first scroll direction within the first container to update the portion being presented until a next item to be introduced into the first container is the first selected item;
determining that scrolling will add the first selected item to the portion being presented; and
removing the first locked item from the first container in response to the determination.

16. The computer implemented system of claim 13, wherein the first locked item is positioned with respect to the second locked item according to their original positions within the list of items.

17. The computer implemented system of claim 13, further comprising:
determining that a predefined number of locked items have been fixed within the first container;
generating a second container configured to present the locked items; and
moving the locked items from the first container to the second container.

* * * * *